United States Patent
Sato

(10) Patent No.: US 6,382,542 B1
(45) Date of Patent: *May 7, 2002

(54) ROTOR BRAKE MECHANISM FOR A SPINNING REEL AND SPINNING REEL

(75) Inventor: Jun Sato, Sakai (JP)

(73) Assignee: Shimano Inc., Sakai (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/099,933

(22) Filed: Jun. 19, 1998

(30) Foreign Application Priority Data

Jun. 24, 1997 (JP) .............................. 9-167079
Jan. 13, 1998 (JP) ............................. 10-004759

(51) Int. Cl.[7] .............................................. A01K 89/02
(52) U.S. Cl. ....................................... 242/243; 242/232
(58) Field of Search ............................... 242/231, 232, 242/233, 243

(56) References Cited

U.S. PATENT DOCUMENTS

| 3,045,942 | A | * | 7/1962 | Henze | 242/243 |
|---|---|---|---|---|---|
| 3,627,223 | A | * | 12/1971 | Monthulet | 242/243 |
| 4,109,880 | A | * | 8/1978 | Yamasaki et al. | 242/243 |
| 4,238,085 | A | * | 12/1980 | Jansson et al. | 242/232 |
| 4,529,142 | A | * | 7/1985 | Yoshikawa | 242/243 |
| 5,524,832 | A | * | 6/1996 | Sakaguchi | 242/233 |
| 5,683,049 | A | * | 11/1997 | Kawabe et al. | 242/232 |
| 5,820,051 | A | * | 10/1998 | Takeuchi et al. | 242/233 |

* cited by examiner

Primary Examiner—Emmanuel M. Marcelo
(74) Attorney, Agent, or Firm—Shinjyu Global IP Counselors, LLP

(57) ABSTRACT

A spinning reel in accordance with the present invention is provided with a reel body 2, a rotor 3, a spool 4 and a rotor brake mechanism 9. The reel body 2 has a handle 1 and is mountable on a fishing rod. The rotor 3 has a first arm portion 31 and a second arm portion 32 disposed to face each other, a bail arm 25 provided to be reversible between a line winding position and a line releasing position at a tip end of the two arm portions, and a bail reversing mechanism 26 for maintaining the bail arm 25 at the line winding position and the line releasing position and for reversing the bail arm 25 between the two positions and is rotatably supported to a front portion of the reel body 2. The spool 4 is disposed in a front portion of the rotor 3 for winding the fishing line thereabout. A rotor brake mechanism 9 brakes the rotor 3 when the bail arm 25 is positioned in the line releasing position. The above configuration makes it possible to maintain the rotational phase of the rotor and to adjust it when the bail arm is brought into the line releasing position in a spinning reel.

9 Claims, 11 Drawing Sheets

ROTOR BRAKE MECHANISM FOR A SPINNING REEL AND SPINNING REEL

BACKGROUND OF THE INVENTION

A. Field of the Invention

The present invention relates to a rotor brake mechanism for a spinning reel where a rotor is configured for winding a fishing line on a spool by rotating around the spool in response to rotation of a handle extending from the spinning reel and where the rotor brake mechanism brakes rotation of the rotor in response to a bail arm being pivoted to a line release position with respect to the rotor.

B. Description of the Related Art

In general, a spinning reel has a reel body, a rotor rotatably supported to a reel body and a spool around which a fishing line is to be wound. The rotor has first and second arm portions disposed to face each other so as to clamp a rotary shaft, and a bail arm pivotally mounted at tip ends of the two arms.

The bail arm has a pair of bail support members pivotally mounted on the first and second arm portions, respectively, a fishing line guide portion including a line roller mounted at a tip end of one of the bail support members, and a bail disposed between the fishing line guide portion and the other bail support member. The bail arm may be positioned in a line winding position for winding fishing line around the outer circumference of the spool and the bail arm may be pivoted to a line releasing position where the bail arm is tilted from the line winding position so as not to be an obstruction when the fishing line is fed out or cast out from the spool.

Also, a bail reversing device is provided on the rotor for maintaining the bail at the line winding position and at the line releasing position and for reversing the bail between the two positions. The bail reversing device has a return mechanism for automatically returning the bail back to the line winding position when the rotor is rotated by the handle while the bail is being kept in the line releasing position.

Also, the spinning reel has a reverse rotation preventing mechanism for preventing the rotor from rotating in a reverse direction (in the rotation in the line feeding direction). When the reverse rotation preventing mechanism operates, the rotor is prevented from rotating in the reverse direction (a direction opposite the direction of rotation for winding line about the spool).

In such a spinning reel, when the fishing line is fed out by, for instance, casting, after the fishing line is hooked by a palm side of an index finger under the condition that the reverse rotation of the rotor is prevented, the bail arm is reversed to the line releasing position. The rotor is rotated so that the line roller comes to the fishing rod side so as to readily hook the fishing line. Then, the fishing rod is swung down and the fishing line is released from the index finger in the midway for waiting for fishing device to reach the water surface. After the fishing device has reached the water surface, when the fishing device sinks to some extent, the handle is rotated and the bail arm is returned back to the line winding position by the return mechanism of the bail reversing device.

Also, when the fishing line is fed by a pull from the fishing device after casting or on the fishing boat, after the bail arm is reversed to the line releasing position, a so-called finger braking operation for pressing the tip end of the spool by the tip end portion of the finger and contacting the palm side of the finger to the fishing line to prevent the fishing line from being loosened is performed. In this case, the rotor is rotated to a position where the bail support members constitutes an obstacle.

PROBLEM TO BE SOLVED BY THE INVENTION

In the above-described conventional spinning reel, when the bail arm is kept in the line releasing position, if the reverse rotation is prevented by the reverse rotation preventing mechanism, there is no possibility that the rotor is rotated in the line feeding direction. However, there is a possibility that the rotor is rotated in the line winding direction. In recent spinning reel models, the rotor is of a very light material and is readily rotatable because the rotational balance is enhanced in order to obtain a high winding efficiency. For this reason, in the spinning reel whose rotational balance is enhanced, the rotor is likely to be rotated with ease in the line winding direction. When the rotor is rotated, even if the rotor is rotated at the rotational phase suitable for the casting or thumbing, the rotational phase of the rotor is readily displaced.

In order to avoid this, there is a prior art in which, when the bail arm is reversed to the line releasing position, the rotation of the rotor is locked. However, if the rotation of the rotor is locked, the readjustment of the rotational phase or position of the rotor relative to the reel housing is impossible. For this reason, whenever the rotational phase need to be modified to change the position of the bail support members for the casting and for thumbing, it is necessary to return each time the bail arm back to the line winding position to readjust the rotational phase.

SUMMARY OF THE INVENTION

An object of the present invention is to make it possible to maintain, in a spinning reel, the rotational phase of the rotor with respect to the reel housing and to adjust the rotational position of the rotor when the bail arm is in the line releasing position.

In accordance with a first aspect of the present invention, a rotor brake mechanism for a spinning reel includes a reel body and a rotor supported on the reel body for rotation in response to rotation of a handle which extends from the reel body. A bail arm is supported on the rotor, the bail arm being configured to pivot about a pivot axis defined on a portion of the rotor between a line winding position and a line releasing position. A brake member made of an elastic material has a ring shape and is disposed in a groove formed in the reel body adjacent to a portion of the rotor. A moving mechanism is supported within a portion of the rotor, the moving mechanism being configured to respond to movement of the bail arm such that a portion of the moving mechanism engages the braking member with the bail arm in the line releasing position.

In the above rotor brake mechanism, when the bail is swung from the line winding position to the line releasing position, the moving mechanism is moved in cooperation with the pivoting motion and is brought into contact with the brake member to thereby brake the rotor. For this reason, when the bail arm takes the line releasing position, the rotor is braked and the rotor never rotates accidentally. In addition, since the moving mechanism is brought into contact with the brake member made of an elastic material to thereby brake the rotor but does not lock the rotor, it is possible to readily rotate the rotor if the rotor is manually rotated. For this reason, once the rotor is set at a suitable rotational phase upon casting or thumbing, it is possible to keep the phase and it is possible to readily rotate the rotor from the set phase to another phase. It is also possible to adjust the rotational phase of the rotor as desired.

Preferably, the moving mechanism includes a lever member pivotally mounted on the rotor for pivotal movement between a first position and a second position such that in the second position a portion of the lever member contacts the brake member and in the first position the lever member is spaced apart from the brake member. As well, the moving mechanism further includes a cooperating mechanism for swinging the lever member toward the second position in cooperation with swing motion of the bail arm when the bail arm is swung from the line winding position to the line releasing position.

Preferably, a tip end portion of the lever member is configured for contact with the brake member and is formed with an arcuate shape with respect to a pivot axis about which the lever member pivots.

Preferably, a bail reversing mechanism is at least partially supported in the rotor. The reversing mechanism is configured to pivot the bail arm from the line releasing position to the line winding position in response to rotation of the rotor with respect to the reel body. The cooperating mechanism at least partially defines a portion of the bail reversing mechanism, and the moving mechanism is configured to maintain the bail arm in the line winding position and in the line releasing position.

In accordance with a second aspect of the present invention, a spinning reel is mountable on a fishing rod for winding a fishing line by rotation of a handle. The spinning reel includes a reel body having a handle, the reel body being mountable on a fishing rod. A rotor having a first arm portion and a second arm portion disposed on opposite circumferential sides of the rotor facing each other, is supported rotatably to a front portion of the reel body. A bail arm is supported at tip ends of the first and second arm portions, the bail arm being pivotable about an axis extending between the tip ends of the first and second arm portions. The bail arm is pivotal between a line winding position and a line releasing position. A spool is supported on the reel body proximate a front portion of the rotor for winding the fishing line. Further, there is a rotor brake mechanism for braking the rotor when the bail arm is positioned in the line releasing position.

Preferably, the rotor further includes a bail reversing mechanism for maintaining the bail arm in the line winding position and the line releasing position and for moving the bail arm from the line releasing position to the line winding position in response to rotation of the rotor with respect to the reel body.

Preferably, the bail arm has a first bail support member and a second bail support member pivotally mounted at the tip ends of the first and second arm portions and a bail extending between the first and second bail support members. The bail reversing mechanism includes a toggle mechanism which maintains position of the bail arm where the bail arm is in one of the line winding position and the line releasing position. The bail reversing mechanism further includes a protrusion formed on the reel body so as to be contactable with a portion of the toggle mechanism with the bail arm in the line releasing position such that in response to contact with the protrusion the toggle mechanism urges the bail arm from the line releasing position toward the line winding position. The rotor brake mechanism is defined by a portion of the toggle mechanism and the rotor brake mechanism is further defined by a brake member disposed on the reel body. The brake member is contactable with a portion of the toggle mechanism for braking the rotor with the bail arm in the line releasing position.

In accordance with a third aspect of the present invention, a spinning reel includes a reel body mountable on a fishing rod and a rotor formed with a first arm portion and a second arm portion disposed to face each other on opposite circumferential sides thereof. A, bail arm extends between tip ends of the first and second arm portions. The bail arm is reversible between a line winding position and a line releasing position. The rotor is supported on a portion of the reel body. A bail reversing mechanism is disposed at least partially in the rotor for maintaining the bail arm in the line winding position and the line releasing position and for reversing the bail arm from the line releasing position to the line winding position in response to rotation of the rotor on the reel body. A spool is supported on the reel body proximate a front portion of the rotor for winding a fishing line. Further, the spinning reel includes a rotor brake mechanism for braking the rotor when the bail arm is positioned in the line releasing position.

Preferably, the bail arm has a first bail support member and a second bail support member pivotally mounted at the tip ends of the first and second arm portions and a bail extending between the first and second bail support members. The bail reversing mechanism includes a toggle mechanism which maintains position of the bail arm where the bail arm is in one of the line winding position and the line releasing position. The bail reversing mechanism further includes a protrusion formed on the reel body so as to be contactable with a return lever of the toggle mechanism with the bail arm in the line releasing position such that in response to contact between the protrusion and the return lever. The toggle mechanism urges the bail arm from the line releasing position toward the line winding position. The rotor brake mechanism is defined by the return lever of the toggle mechanism and by a brake member disposed on the reel body, the brake member being contactable with the return lever of the toggle mechanism for braking the rotor with the bail arm in the line releasing position.

Preferably, the brake member is made of an elastic material and disposed substantially in the shape of a ring along a portion of the reel body proximate a portion of the rotor.

Preferably, the brake member is disposed in the reel body such that the brake member is not contactable with the return lever of the toggle mechanism with the toggle mechanism being circumferentially positioned proximate the protrusion.

Preferably, the toggle mechanism includes a first toggle spring mechanism disposed in the first arm portion for biasing the toggle mechanism into one of a first position and a second position, the first position corresponding to the bail arm being in the line winding position and the second position corresponding to the bail arm being in the line releasing position. The toggle mechanism also includes a second toggle spring mechanism which is disposed on the rotor and engaged with the return lever of the toggle mechanism for biasing the return lever into one of the first position and the second position.

Preferably, the first toggle spring mechanism includes: a first rod having a first end retained in a portion of the first bail support member, the first rod extending along the first arm portion; a first sleeve-like member into which a second end of the first rod is slidably inserted, the first sleeve-like member being mounted in the first arm portion and being pivotal about a mid-portion thereof with respect to the first arm portion within the first arm portion of the rotor; and a first spring inserted into an interior of the first sleeve-like member for biasing the first rod toward the first bail support member. The return lever is engageable with a portion of the first sleeve-like member. The second toggle spring mechanism includes: a second rod having one end retained in a portion of the return lever, a second sleeve-like member in which the second rod is received and which is pivotally mounted on the rotor, and a second spring for biasing the second rod toward the return lever.

Alternatively, the first toggle spring mechanism includes: a first rod having a first end retained in a portion of the first bail support member, the first rod extending along the first arm portion; a first sleeve-like member into which a second end of the first rod is slidably inserted, the first sleeve-like member being mounted in the first arm portion and being pivotal about a mid-portion thereof with respect to the first arm portion within the first arm portion of the rotor; and a first spring inserted into an interior of the first sleeve-like member for biasing the first rod toward the first bail support member. The return lever is engageable with a portion of the first sleeve-like member. The second toggle spring mechanism includes: a second rod having one end retained in a portion of the rotor, a second sleeve-like member in which the second rod is received and which is pivotally mounted on the a portion of the return lever, and a second spring disposed between the second rod and the second sleeve-like member for biasing the second sleeve-like member toward the return lever.

Preferably, a contact portion of the return lever is configured to contact the brake member and said contact portion is formed with an arcuate shape.

In the above spinning reel, the bail arm is reversed to the line releasing position upon casting or thumbing. Also, when the feeding of the fishing line is stopped or the fishing line is wound, the bail arm is returned back to the line winding position. When it is reversed to the line winding position and the rotor is rotated, the fishing line is guided by and wound around the spool. On the other, when the bail arm is in the line releasing position, the rotor is braked by the rotor brake mechanism. Accordingly, there is no fear that the rotor is rotated accidentally. In addition, since the brake mechanism just brakes the rotor but does not lock the rotor, it is possible to readily rotate the rotor if the rotor is manually rotated. For this reason, once the rotor is set at a suitable rotational phase upon casting or thumbing, it is possible to keep the phase and it is possible to readily rotate the rotor from the set phase to another phase. It is also possible to adjust the rotational phase of the rotor as desired.

As well, in the above configurations of the present invention, the return lever is a part of a bail reversing mechanism and is also part a rotor braking mechanism thus reducing the number of moving parts and simplifying manufacturing costs.

The rotor brake mechanism just brakes the rotor but does not lock the rotor in place, since with additional force it is still possible to rotate the rotor against the braking force. For this reason, once the rotor is set at a suitable rotational phase upon casting or thumbing, it is possible to keep the phase and to readily rotate the rotor from the set phase to another phase. It is also possible to adjust the rotational phase of the rotor as desired.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENTS

First Embodiment

Figure 1:
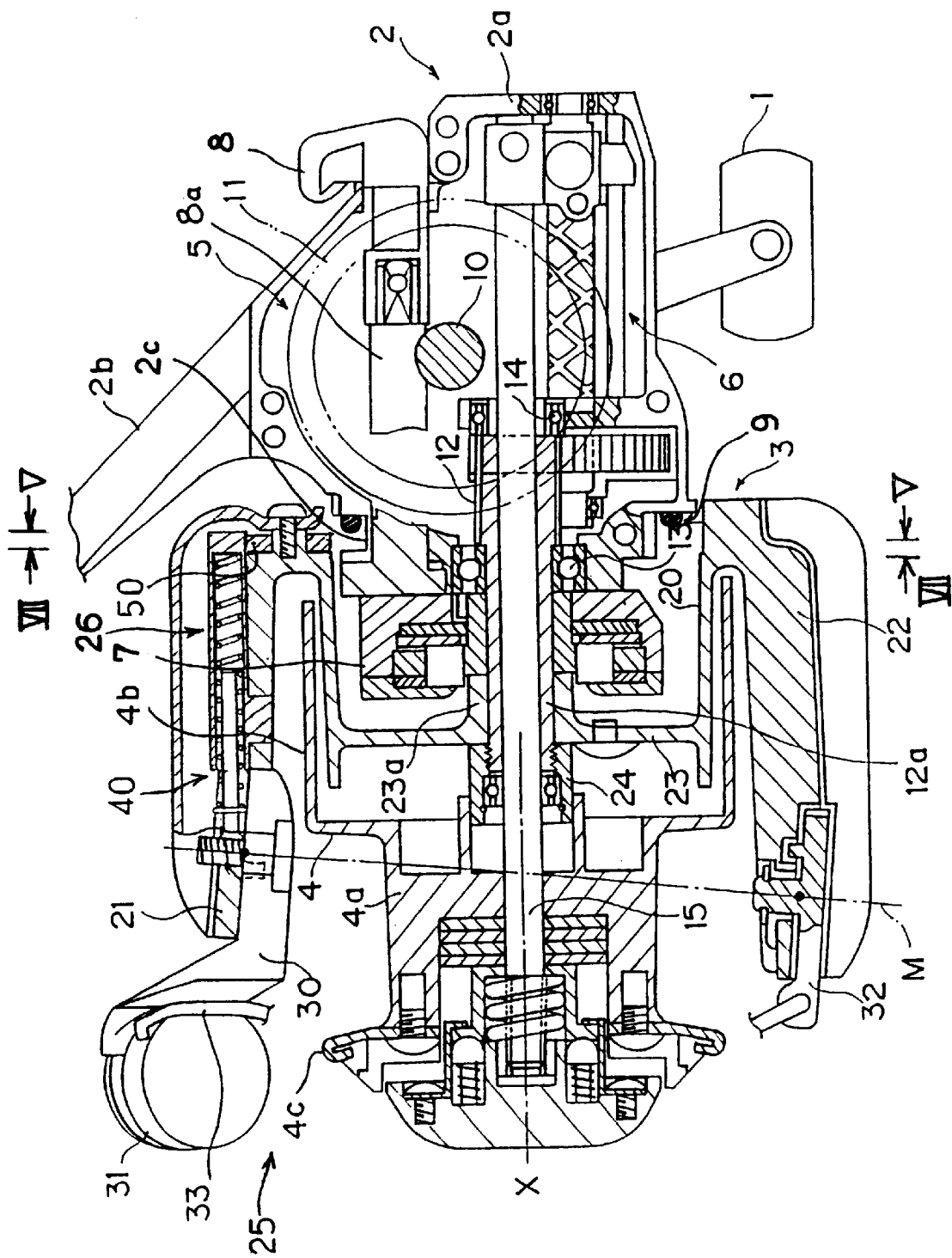
FIG. 1 is a cross-section side view of a spinning reel having a spool, a rotor and a bail in accordance with a first embodiment of the present invention.

A spinning reel in accordance with a First Embodiment of the present invention is shown in FIG. 1 and is provided with a reel body 2 having a handle 1, a rotor 3 rotatably supported on a front portion of the reel body 2, and a spool 4 disposed in the front portion of the rotor 3 for winding the fishing line.

The reel body 2 has a body 2a having an upper portion on which a mounting portion 2b is formed for mounting the spinning reel on the fishing rod. An annular recess 2c is formed in the front portion of the body 2a. Also, in the interior of the body 2a, there are provided a rotor drive mechanism 5 for rotating the rotor 3, an oscillating mechanism 6 for moving the spool 4 back and forth along a rotational center axis X to uniformly wind the fishing line on the spool 4, a reverse rotation preventing mechanism 7 for preventing the reverse rotation of the rotor 3 (the rotation in the line feeding direction), and a rotor brake mechanism 9 for braking the rotation of the rotor 3.

The rotor drive mechanism 5 has a face gear 11 rotating together with a shaft 10 to which the handle 1 is fixed, and a pinion gear 12 engaged with the face gear 11. The pinion gear 12 is formed into a sleeve and a front portion 12a extends toward the spool 4 through a central portion of the rotor 3. A screw portion is formed at a distal end of the pinion gear 12. In such an arrangement, the face gear 11 and the pinion gear 12 are rotated by the handle, and the rotor 3 fixed to the pinion gear 12 is also rotated.

In the reverse rotation preventing mechanism 7, a roller type one-way clutch is used and consequently idle rotation of the rotor 3 upon the reverse rotation is thereby limited. The reverse rotation preventing mechanism 7 may be selectively engaged and dis-engaged by means of an operating lever 8 which may be moved from a reverse rotation preventing position and to a reverse rotation allowing position. The operating lever 8 is pivotally mounted on a rear portion of the body 2a. An operating shaft 8a fixed to the operating lever 8 extends to the reverse rotation preventing mechanism 7.

The rotor 3 has a cylindrical portion 20, a first arm portion 21 and a second arm portion 22 which are formed to face each other on opposite sides of the cylindrical portion 20, a bail arm 25 which extends between the two arm portions 21 and 22. The bail arm 25 may be pivoted about an axis M defined between the two arm portions 21 and 22 between a line winding position and a line releasing position. The rotor 3 also includes a bail reversing mechanism 26 which is configured to move the bail arm 25 to the line winding position from the line releasing position in a manner described below. The cylindrical portion 20 and the two arm portions 21 and 22 are formed as a single unitary piece.

A front wall 23 is formed at the front portion of the cylindrical portion 20. A boss 23a is formed in the central portion of the front wall 23. A through-hole is formed in the central portion of the boss 23a. The front portion 12a of the pinion gear 12 and the spool shaft 15 pass through the through-hole. A nut 24 is disposed on the front side of the front wall 23. The nut 24 is engaged with a screw portion at a front end of the pinion gear 12. A bearing for rotatably supporting the spool shaft 15 is disposed in the inner circumferential portion of the nut 24.

The bail arm 25 includes a first bail support member 30 and a second bail support member 32 which are pivotally mounted on the inner circumferential sides at tip ends of the first and second arm portions 21 and 22, respectively. The bail arm 25 also includes a line roller 31 and the bail 33. The line roller 31 serves to guide the fishing line to the spool 4 and is mounted rotatably at the tip end of the first bail support member 30. The bail 33 extends between the line roller 31 at the tip end of the first bail support member 30 and the second bail support member 32.

As mentioned above, the bail arm 25 is configured to be swung about the swing axis M which is not perpendicular to the rotational center axis X but rather is slanted at a predetermined angle. The bail arm 25 may be positioned in the line winding position for guiding the fishing line to the outer circumference of the spool 4 (see FIG. 2) and may be manually pivoted into the line releasing position for allowing the fishing line to be cast out or fed out from the spool 4 (see FIG. 3).

The bail reversing mechanism 26 will now be described.

As shown in FIGS. 2 to 5, the bail reversing mechanism 26 includes a first toggle spring mechanism 40 disposed within the first arm portion 21, a second toggle spring mechanism 41 (FIG. 5) disposed within the rotor 3, and a switching projection 42 formed on an outer surface of the annular recess 2c of the reel body 2. The switching projection 42 serves as a switching member in a manner described below.

Figure 4:
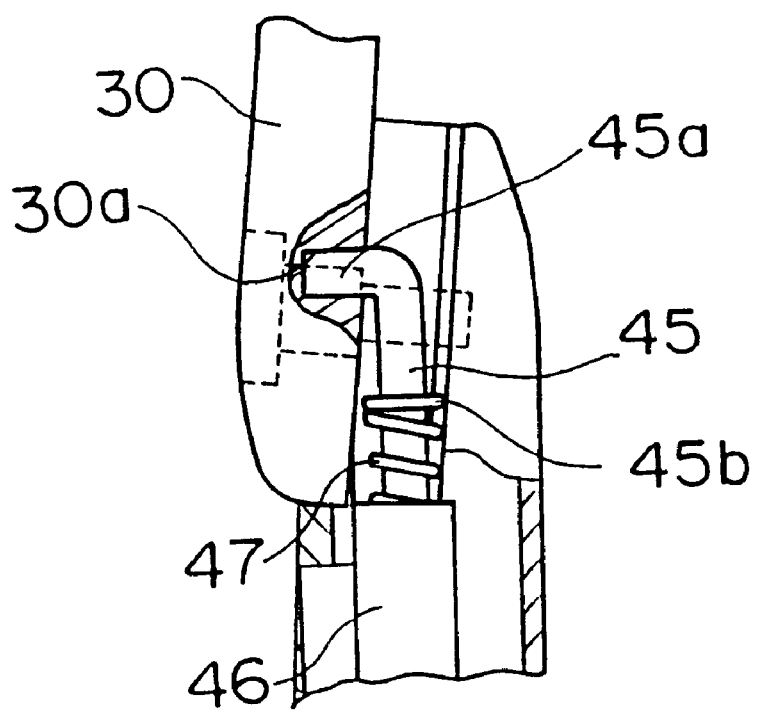
FIG. 4 is a fragmentary, part cross-section view of a first toggle spring mechanism associated with the first arm portion.

The first toggle spring mechanism 40 has a first rod 45 extending back and force along the first arm portion 21, a first sleeve-like member 46 into which a rear end portion of the first rod 45 is slidably inserted and a first spring 47 for biasing the first rod 45 in a front direction. The first rod 45 is bent at a front end portion 45a inwardly as shown in FIG. 4 and engaged is with a hole 30a formed in the first bail support member 30. Also, a jaw portion 45b is formed in the first rod 45. The front end of the first spring 47 is in contact with the jaw portion 45b. The first sleeve-like member 46 is pivotally mounted on the first arm portion 21 about a swing center A shown in FIG. 2. On the other hand, a stop portion 21a is formed in the front end portion of the first arm portion 21.

Figure 2:
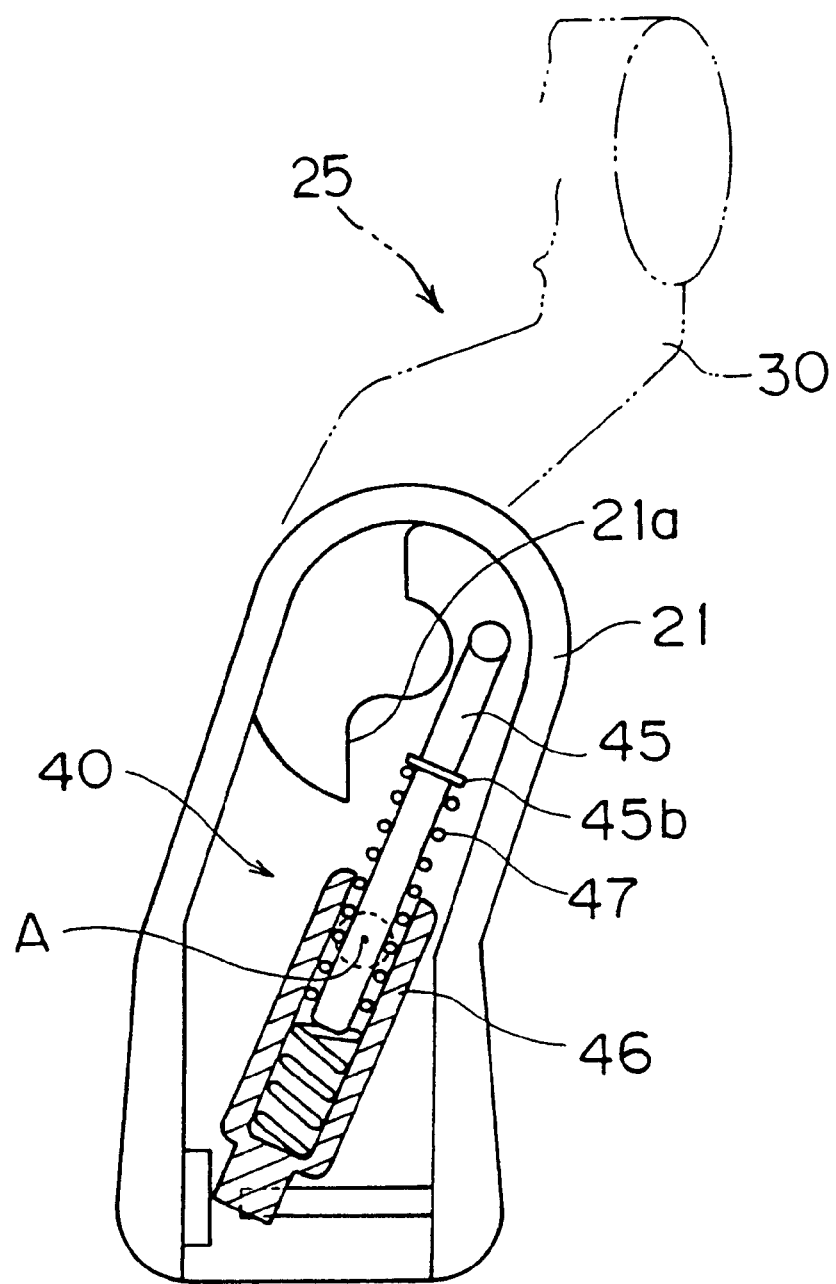
FIG. 2 is a fragmentary, part cross-section view of an interior of a first arm portion which supports the bail of the spinning reel depicted in FIG. 1 with the first arm portion in a position corresponding to the bail being in a line winding position.
Figure 3:
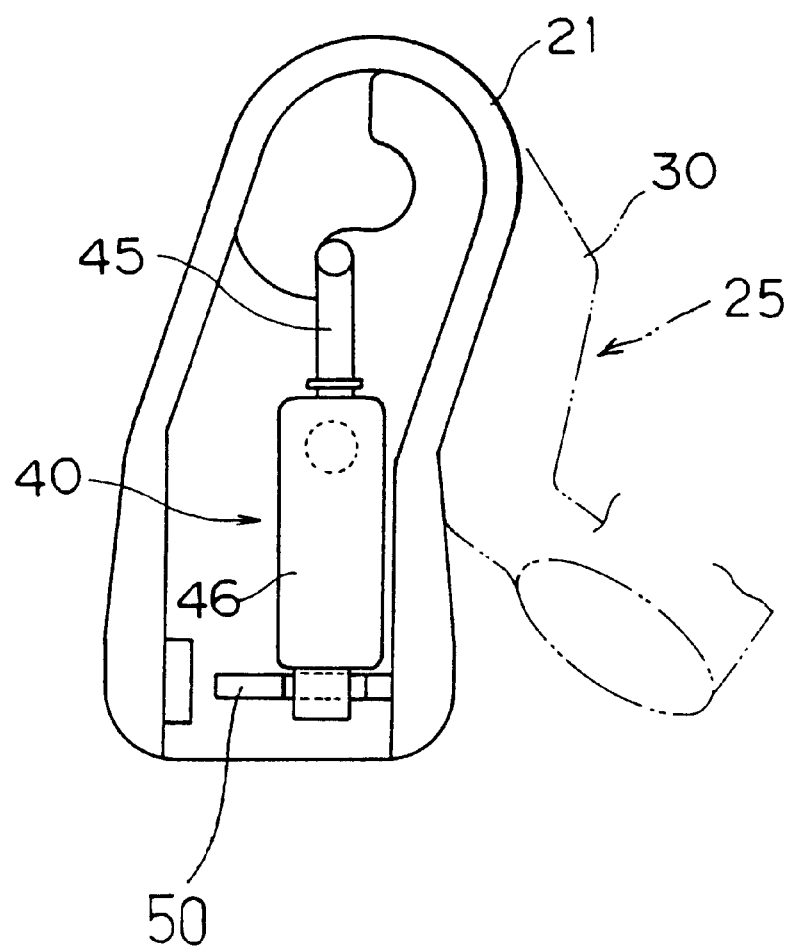
FIG. 3 is a fragmentary view similar to FIG. 2, showing the interior of a first arm portion which supports the bail of the spinning reel depicted in FIG. 1 with the first arm portion in a position corresponding to the bail being in a line releasing position.

The thus constructed first toggle spring mechanism 40 may take a first position as shown in FIG. 2 and a second position as shown in FIG. 3. The first position corresponds to the line winding position of the bail arm 25 and the second position corresponds to the line releasing position of the bail arm 25. Also, the second position of the first toggle spring mechanism 40 shown in FIG. 3 is such that the first toggle spring mechanism 40 cannot force bail arm 25 to pivot about the swing axis M.

The second toggle spring mechanism 41 includes a return lever 50 pivotally mounted on a rear surface of a portion of the rotor 3 between the cylindrical portion 20 and the first arm portion 21. The return lever 50 pivots about a shaft that is generally parallel to the spool shaft 15. The second toggle spring mechanism 41 also includes a second rod 51 retained at one end to the return lever 50, a second sleeve-like member 52 within which the second rod 51 is received and which is pivotally mounted to one end to the rotor 3, and a second spring 53 which biasing the second rod 51 toward the return lever 50. Incidentally, the second rod 51 and the second spring 53 are moveable in a plane that is perpendicular to the spool shaft 15 and therefore parallel with a rotor rotational plane.

Figure 5:
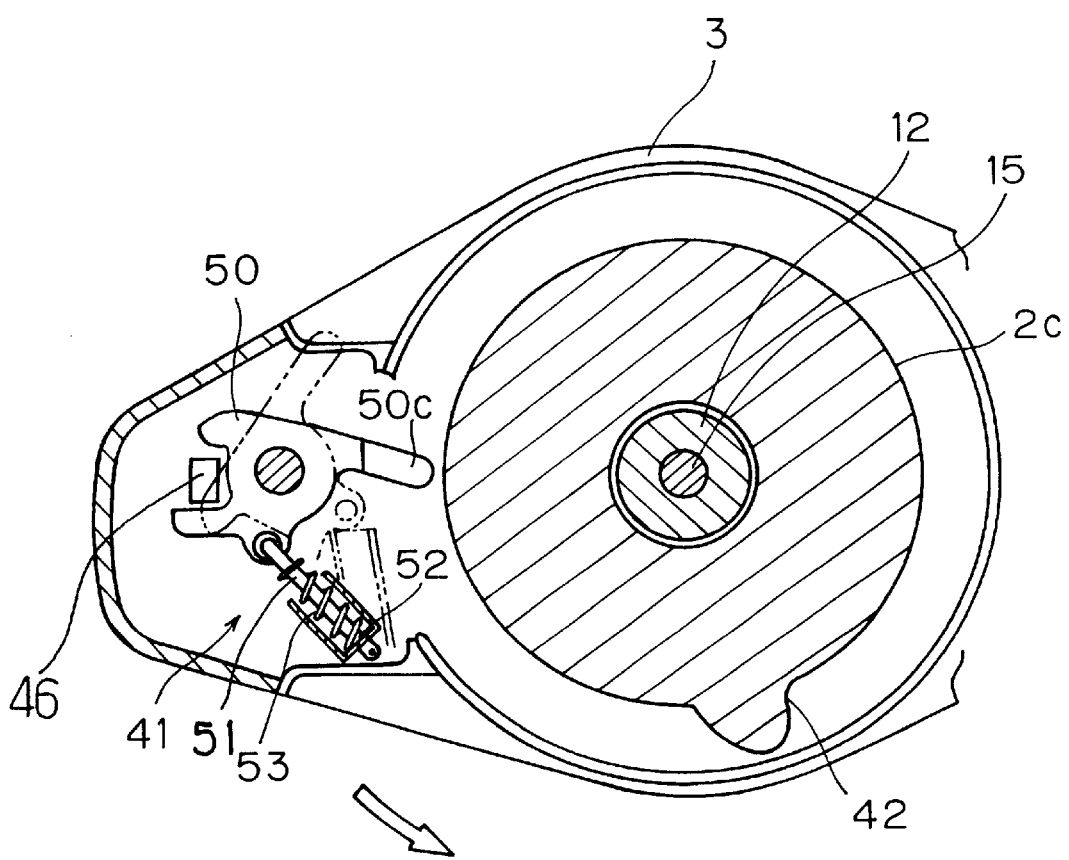
FIG. 5 is a fragmentary, part cross-section bottom view of the rotor showing details of a second toggle mechanism taken along the line V—V in FIG. 1.
Figure 6:
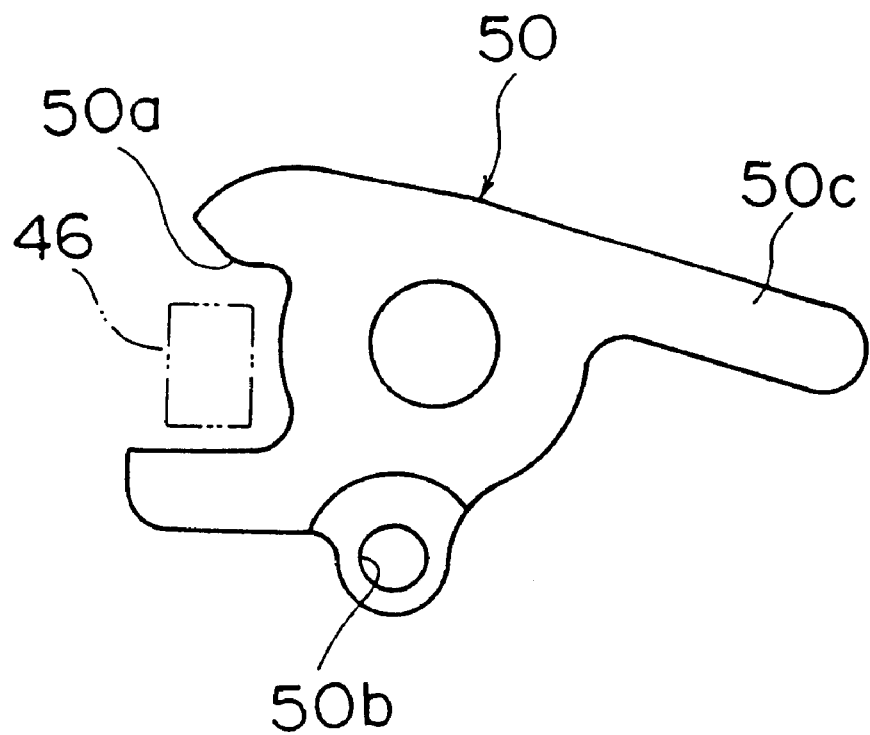
FIG. 6 is an enlarged view of a lever of the second toggle spring mechanism depicted in FIG. 5.
Figure 7:
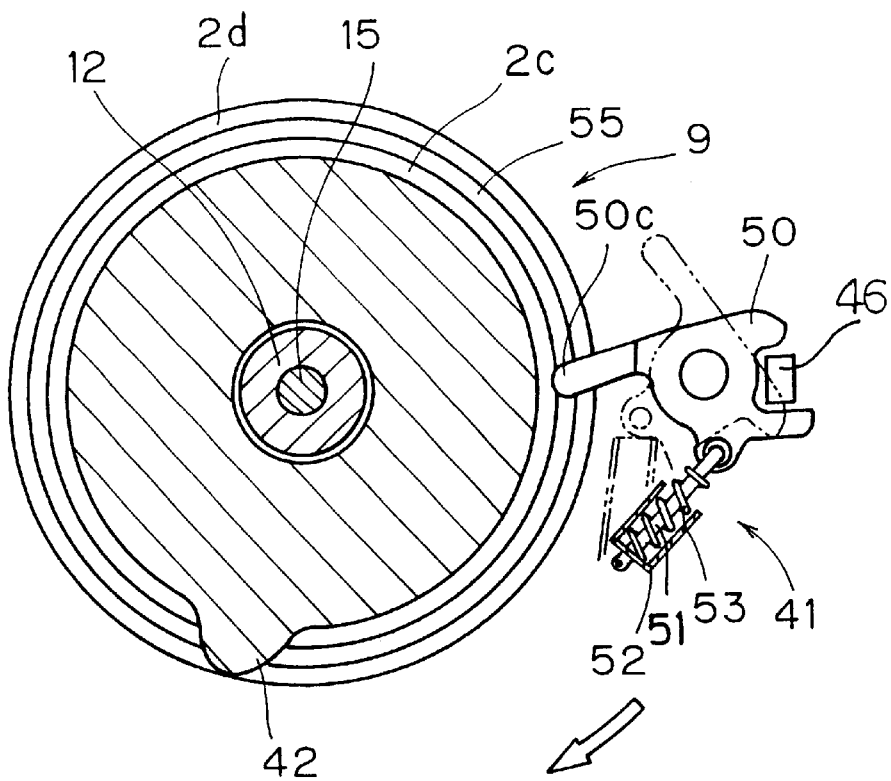
FIG. 7 is a cross-sectional view taken along the line VII—VII in FIG. 1.

A retainer cutaway 50a is formed in the return lever 50 which receives a rear end of the first sleeve-like member 46. As can be seen in FIGS. 5, 6 and 7, the retainer cutaway 50a is larger that the portion of the first sleeve-like member 46 which extends into the retainer cutaway 50a. Therefore, when the return lever 50 moves with respect to the first sleeve-like member 46 or vis versa, the two components collide with one another making a collision sound. Thus, the collision sound indicates to an operator that the bail arm 25 has been switched over from one position to another position.

As shown in FIG. 5, the switching projection 42 formed in the annular recess 2c of the body 2a extends radially outwardly. When the return lever 50 of the second toggle spring mechanism 41 is rotated together with the rotor 3, the switching projection 42 may come into contact with the projection 50c of the return lever 50. The switching projection 42 smoothly collides with the projection 50c of the return lever 50 and has a curved shape so as to accelerate the smooth rotation of the return lever 50.

Figure 8:
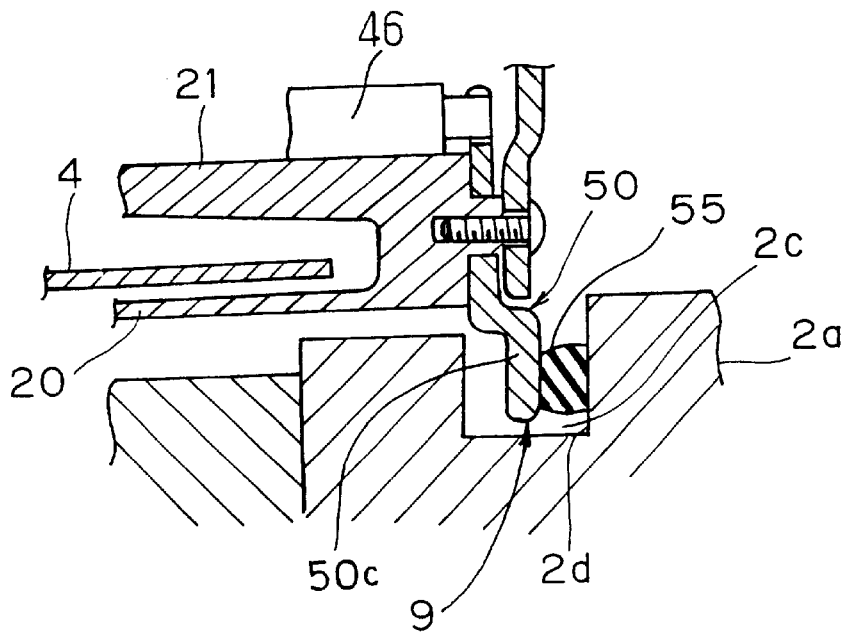
FIG. 8 is an enlarged view of a rotor brake mechanism.

Referring again to FIG. 1, the rotor brake mechanism 9 is a mechanism for braking the rotor 3 when the bail arm 25 is moved to the line releasing position. As shown in FIGS. 7 and 8, the rotor brake mechanism 9 includes the projection 50c of the above-described return lever 50, and a brake member 55 which is positioned to contact the projection 50c when the projection 50c is in the position indicated in solid lines in FIG. 7, specifically when the projection 50c is pointing generally radially inward toward the rotor rotational center axis when the bail arm 25 is in the line releasing position. The brake member 55 is made of an elastic material such as, for example, NBR, silicone rubber. The brake member 55 is mounted on the wall surface 2d of the annular recess 2c of the body 2a and is disposed substantially in the form of a ring along the rotor rotational direction except the portion where the switching projection 42 of the wall surface 2d is formed. The cross-section of the brake member 55 is, for example, in the form of a semicircular shape and is elastically deformed in a direction perpendicular to the wall surface 2d by the contact with the projection 50c, which moves in a direction parallel to the wall surface 2d, when the bail arm 25 is positioned in the line releasing position. In other words, the direction in which the projection 50c is moving when the projection 50c contacts the brake member 55 is substantially perpendicular to the direction in which the brake member 55 is compressed. Here, the brake member 55 is provided in the ring substantially along the rotor rotational direction so that, even if the rotor 3 is stopped at any rotational phase, when the bail arm 25 is reversed to the line releasing position, the rotor 3 is always braked.

The bail reversing operation will now be described.

When the fishing line is to be wound around the spool 4, the bail arm 25 is brought into the line winding position under the condition that the reverse rotation preventing mechanism 7 is brought into the reverse rotation preventing position by the operating lever 8 to thereby prevent the reverse rotation of the rotor 3. In this case, the first bail support member 30 and the second bail support member 32 are in the upright state on the front side as shown in FIGS. 1 and 2. Under this condition, in the first toggle spring mechanism 40, the first sleeve-like member 46 is swung clockwise by the first spring 47 as shown in FIG. 2, and the first rod 45 is in the advanced condition. Also, in the second toggle spring mechanism 41, the return lever 50 is positioned in the first position shown by two-dotted and dash lines in FIG. 5, and this condition is maintained by the second rod 51 due to the biasing force of the second spring 53. Incidentally, in this condition, the projection 50c of the return lever 50 is retracted on the outer circumferential side of the rotor, and there is no fear that the projection 50c would come into contact with the switching projection 42 as the rotor 3 rotates.

When the bail arm 25 is tilted from this condition, the first bail support member 30 and the second bail support member 32 are tilted rearwardly to take the line releasing position as shown in FIG. 3. In the condition that the bail arm 25 is tilted in the line releasing position, it is possible to readily feed the fishing line from the spool 4. Under this condition, in the first toggle spring mechanism 40, the first rod 45 is rotated counterclockwise in FIG. 3 by the rotation of the first bail support member 30 and is located at the second position. According to this, the first sleeve-like member 46 is swung counterclockwise about the swing center A. In the second toggle spring mechanism 41, the return lever 50 is swung clockwise in FIG. 5 in accordance with the swing motion of the first sleeve-like member 46 and is located in the second position indicated by the solid line. In this condition, the return lever 50 is retained in position by the second rod 51 and the second spring 53.

When the return lever 50 is swung to the second position, as shown in FIGS. 7 and 8, the projection 50c of the return lever 50 extends toward the rotor rotational center axis and comes into elastic contact with the brake member 55. As a result, the rotor 3 is braked so that its rotational movement is restrained. However, since return lever 50 on the rotor 3 simply contacts elastically with the brake member 55 and is braked by the friction contact therewith, it is possible to adjust the rotational position by forceably rotating the rotor 3 manually or by applying extra rotating force on the handle 1.

If the rotor 3 is rotated in the line winding direction by the handle 1 operation while keeping the bail arm 25 in the line releasing position, in FIG. 5, the return lever 50 of the second toggle spring mechanism 41 is rotated counterclockwise as indicated by a blank arrow in FIG. 7 together with the rotor 3. Then, the projection 50c of the return lever 50 collides against the switching projection 42 fixed on the side of the reel body 2. Thus, the return lever 50 is kicked up to be switched over to the first position indicated by the two-dot and dash line. As a result, the first sleeve-like member 46 of the first toggle spring mechanism 40 is switched over to the first position shown in FIG. 2 from the second position shown in FIG. 3, and the first bail support member 30 and the second bail support member 32 are switched over to the line winding position assisted by the biasing force of the first spring 47.

At this time with the first toggle spring mechanism 40 in the second position (FIG. 3), the first rod 45 is substantially at a dead point (where its biasing force in inoperable) so that movement to the first position (FIG. 2) is effected only by applying a little force in addition to the force from the second toggle spring mechanism 41. Also, since the second toggle spring mechanism 41 is structured so that its position is switched by the return lever 50 rotating within the rotor rotational plane, the force of the rotor rotation is effectively transmitted to the return lever 50 without any reduction. Accordingly, upon the operation of the handle, it is possible to switch the bail from the line releasing position to the line winding position with a small amount of force.

Also, if the bail arm 25 is in the line releasing position, the projection 50c comes into contact with the brake member 55 and the rotor 3 is braked by the frictional force so that the rotational position may be maintained. Accordingly, there is no possibility that the rotor 3 is rotated when the bail arm 25 is brought into the line releasing position. Accordingly, it is possible to overcome the defects due to an accidental rotation of the rotor 3 upon the casting or thumbing. In addition, since the rotor 3 is braked only by the friction, if the force is applied to the rotor 3, it is possible to readily rotate it and to adjust the rotational phase.

Second Embodiment

Figure 9:
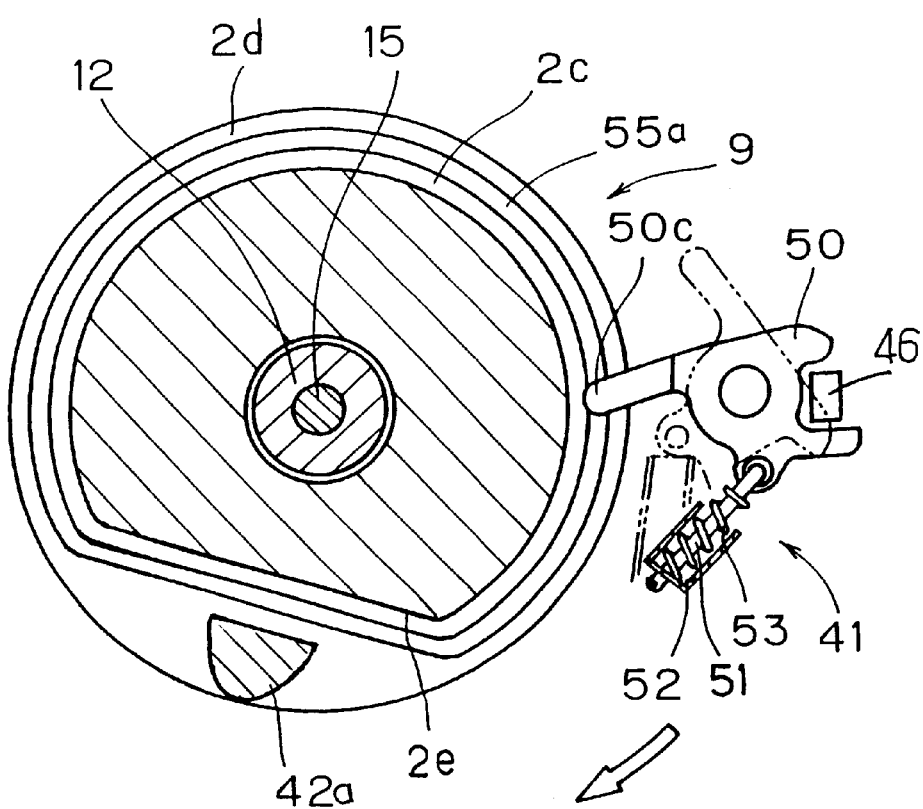
FIG. 9 is a part elevation, part cross-section view, similar to FIG. 7, showing a rotor and toggle spring mechanism in accordance with a second embodiment.

In a Second Embodiment, most elements and structures are the same as in the First Embodiment described above. Therefore, only those portions, features and functions which differ from the First Embodiment will be described in detail. As shown in FIG. 9, a linear groove 2e is provided between the switching projection 42a and the other portion in the annular recess 2c. A brake member 55a is mounted such that the brake member 55a defines a D-shaped ring so as to pass through the groove 2e. The brake member 55a extends through a generally straight portion of the groove 2e that is located on an inner circumferential side of a switching projection 42a. Further, in the generally straight portion of the groove 2e, the brake member 55a is disposed radially inward from a position contactable by the projection 50c. For this reason, if the projection 50c is positioned as shown in solid lines in FIG. 9, where the bail arm is in a line releasing position, and further the projection 50c located in the vicinity of the projection 42a, the projection 50c is spaced apart from the braking member 55a.

Since the brake member 55a is endless in the Second Embodiment, it is possible to use an elastic member available on the market such as an O-ring. Also, when the rotor 3 is rotated under the condition that the bail arm 25 is kept in the line releasing position, since the projection 50c is separated away from the brake member 55a in the vicinity of the switching projection 42a so that the brake is released, the rotation of the rotor 3 is light and the second toggle spring mechanism 41 may readily be moved from the second position to the first position.

Incidentally, in the case where the O-ring is used for the brake member 55a, it is sufficient that a D-shaped groove for mounting the O-ring may be formed in the wall surface 2d and the O-ring may be fixed by a suitable fixing means such as an adhesive.

Third Embodiment

In a Third Embodiment, most elements and structures are the same as in the First Embodiment described above. Therefore, only those portions, features and functions which differ from the First Embodiment will be described in detail.

Figure 10:
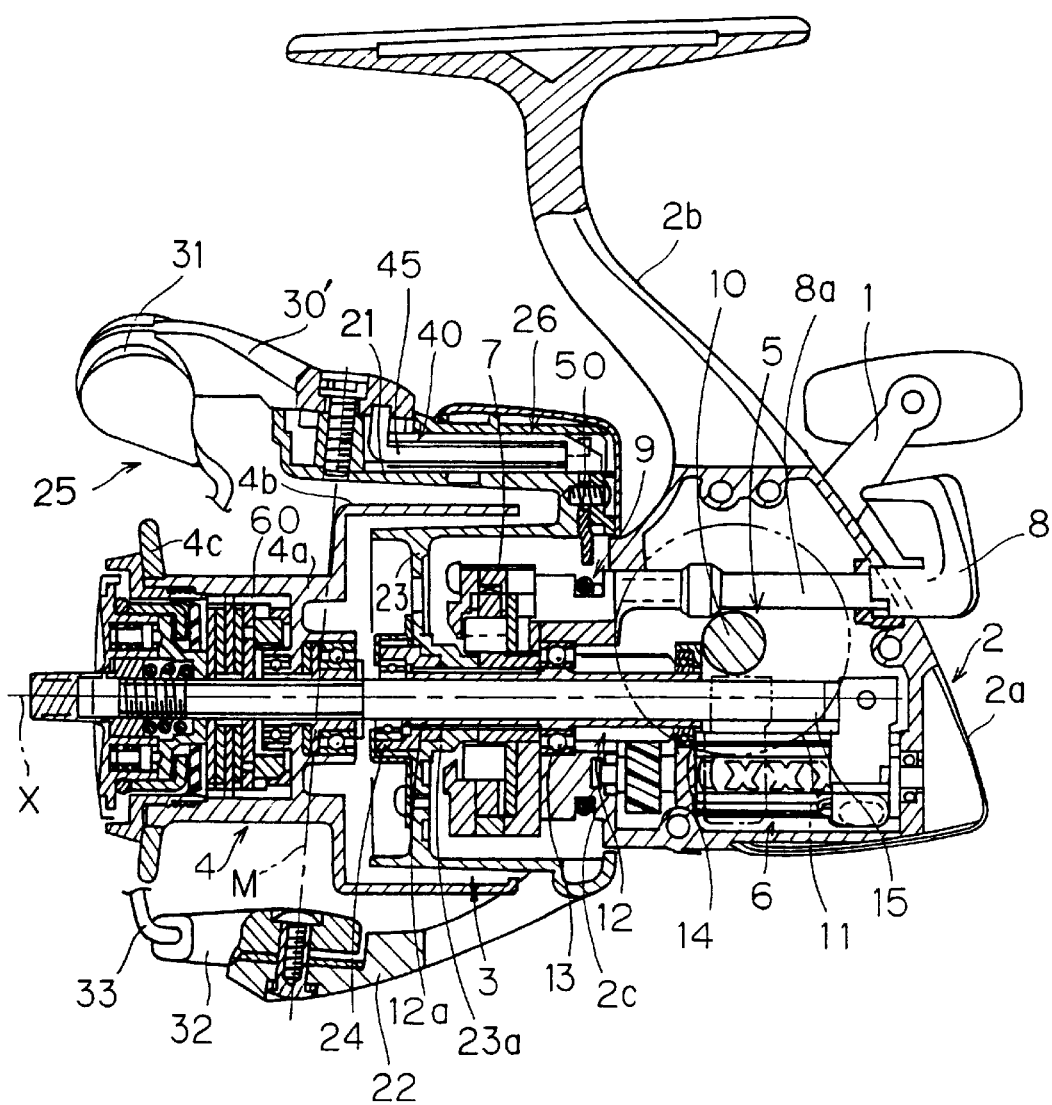
FIG. 10 is a cross-section side view similar to FIG. 1, showing a spinning reel having a spool, a rotor and a bail in accordance with a third embodiment of the present invention.

As shown in FIG. 10, in a Third Embodiment, the first bail support member 30' is pivotally mounted outside of the first arm portion 21. For this reason, the first rod 45 of the first toggle spring mechanism 40 of the bail reversing mechanism 26 is bent at its tip end radially outwardly and is engaged with the first bail support member 30'. The other structure of the first toggle spring mechanism 40 is the same as that of the above-described First Embodiment.

Figure 11:
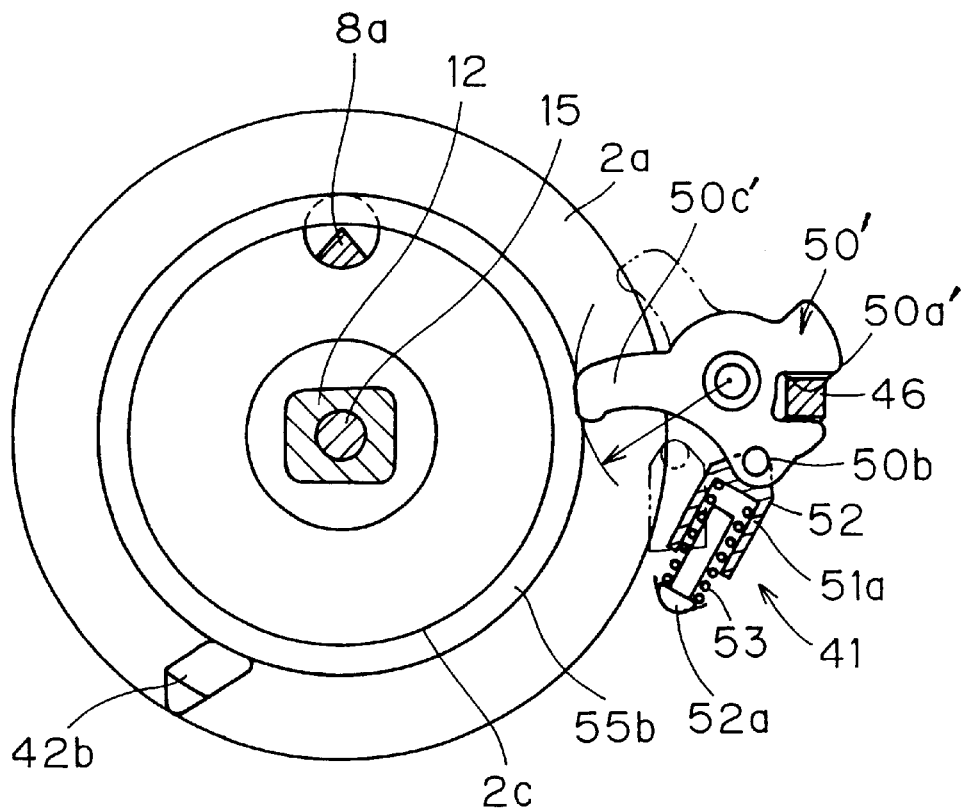
FIG. 11 is part cross-section view similar to FIG. 7 showing details of a toggle mechanism in accordance with the third embodiment of the present invention.
Figure 12:
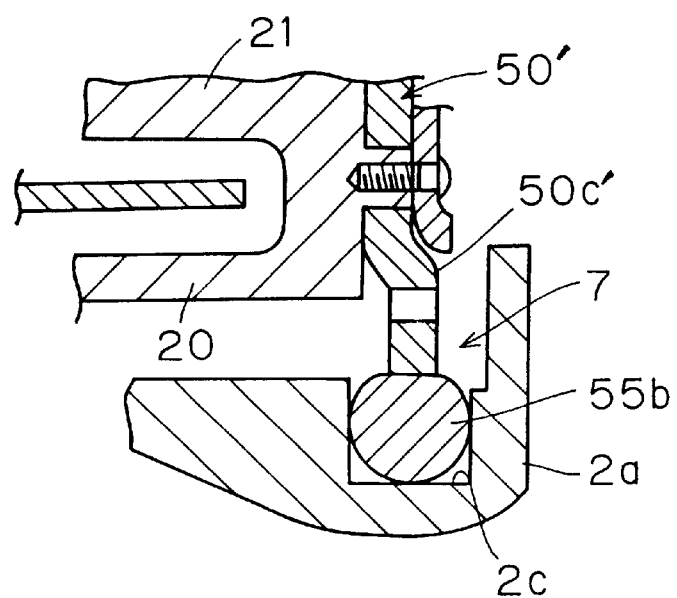
FIG. 12 is a cross-section view similar to FIG. 8 showing further details of the third embodiment.

As shown in FIGS. 11 and 12, the second toggle spring mechanism 41 has a return lever 50, a second sleeve-like member 51a retained to the return lever 50' at one end, a second rod 52a which is received at one end in the second sleeve-like member 51a and pivotally mounted at the other end to the rotor 3, and a second spring 53 for biasing the second sleeve-like member 51a on the side of the return lever 50. The return lever 50' is pivotally mounted within a plane in parallel with the rotor rotational plane to a rear surface of the joint portion between the cylindrical portion 20 of the rotor 3 and the first arm portion 21.

The above arrangement is different from that of the First Embodiment and the arrangements of the sleeve-like member and the rod are reversed. Incidentally, the second sleeve-like member 51a and the second spring 53 are moved within the plane in parallel with the rotor rotational plane (the rotor rotational plane being perpendicular to the central axis of the spool shaft 15).

The return lever 50' has a retainer cutaway 50a' for retaining the rear end of the first sleeve-like member 46 of the first toggle spring mechanism 40, a hole 50b for retaining the second sleeve-like member, and a projection 50c that extends toward the rotor rotational center axis. A gap is defined between the surfaces of the retainer cutaway 50a and the rear portion of the first sleeve-like member 46 to allow for a collision sound to be produced upon relative movement therebetween.

Also, in the Third Embodiment, a brake member 55b is composed of the O-ring, and is mounted on a bottom portion of the annular recess 2c unlike the above-described two embodiments. For this reason, as shown in FIG. 12, the tip end portion of the projection 50c is brought into contact with the outer circumferential portion of the brake member 55b rather than the side portion thereof. As shown in FIG. 11, the tip end portion of the projection 50c is formed into an arcuate shape about the swing center of the return lever 50. Therefore, when the projection 50c contacts the brake member 55b, the projection 50c is moving in a direction that is substantially tangential to the circumference of the brake member 55b. As seen in FIG. 12, the brake member 55b then becomes compressed in the radial direction of the circumference of the brake member 55b. In other words, the direction in which the projection 50c is moving when the projection 50c contacts the brake member 55b is substantially perpendicular to the direction in which the brake member 55b is compressed. The projection 50c is thus formed on the arcuate shape, so that, even if the return lever 50 is swung to some extent by the displacement when the rotor 3 is rotated upon the braking, the projection 50c always enters by the same amount from the outer circumferential side into the brake member 55. Thus, the contact condition hardly changes. For this reason, even if the rotor 3 is manually rotated, the brake force hardly changes so that a stable brake force can be obtained.

In the structure of such a second toggle spring mechanism 41, the return lever 50' may take the first position indicated by the two-dot and dash line and the second position indicated by the solid line in FIG. 11 with the second sleeve-like member 51a and the second spring 53 applying force to assist in the toggling thereof. The first position corresponds to the first position of the first toggle spring mechanism 40 and the line winding position of the bail arm 25, and the second position corresponds to the second position of the first toggle spring mechanism 40 and the line releasing position of the bail arm 25.

The switching projection 42b is formed in the wall portion of the annular recess 2c of the body 2a on the outer circumferential side of the brake member 55b and the brake member 55b may be arranged substantially in an annular shape.

An operating shaft 8a of the operating lever 8 is cut away into a triangular shape at a position where the brake member 55b passes as shown in FIG. 11 in order to avoid the brake member 55b composed of the O-ring.

Other Embodiments

The above embodiments may be further modified in a variety of ways and still remain within the scope of the invention. For example, the following modification may be made.

Figure 13:
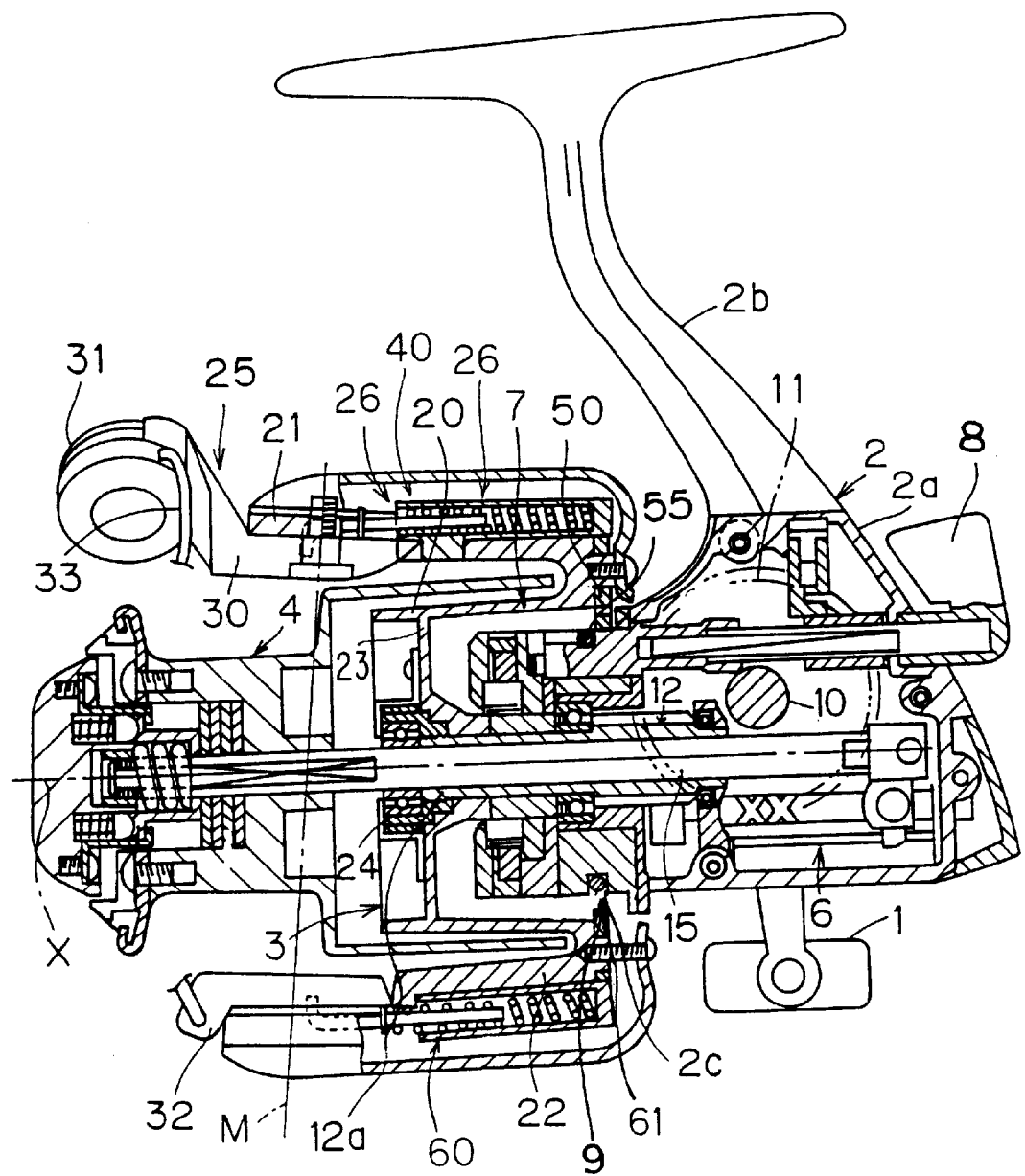
FIG. 13 is a side cross-section view similar to FIG. 1 showing details of a fourth embodiment.

(a) The arrangements of the bail reversing mechanism and the rotor brake mechanism are not limited to those of the above-described embodiments. It is possible to provide the rotor brake mechanism separately from the bail reversing mechanism. For instance, as shown in FIG. 13, a cooperating mechanism 60 composed of a toggle spring mechanism and a lever member 61 operated by the cooperating mechanism 60 are provided on the second arm portion 22 of the rotor 3.

(b) The O-ring is used as the brake member in the foregoing embodiments but the cross-section of the brake member is not limited to a circular shape like the O-ring.

(c) The positional relationship between the first rod 45 and the first sleeve-like member 46 in the first toggle spring mechanism 40 may be the opposite positional relationship as shown in the second toggle spring mechanism 41 of the third embodiment, i.e, the arrangement in which the first sleeve-like member 46 is engaged with the first bail support member 30.

(d) The return lever is operated by the toggle spring mechanism in the foregoing embodiments. However, as disclosed in Japanese Utility Model Publication No. SHO 59-139069, it is possible to make the return lever as one example of the moving mechanism operate independently of the toggle spring mechanism. In this case, the operation mode of the return lever is not limited to the swing motion. It is possible to use any operational mode if it is structured that the return lever moves in cooperation of the swing motion of the bail arm as disclosed in the above-described publication.

EFFECT OF THE INVENTION

According to the present invention, if the bail arm is brought in the line releasing position, the rotor is braked.

Accordingly, there is no fear that the rotor is rotated accidentally. In addition, since the rotor is braked but is not locked, it is possible to readily rotate the rotor manually using extra force to overcome the braking. For this reason, if the rotor is once set at an optimum rotational phase upon casting or thumbing, it is possible to maintain its phase and also to readily rotate the rotor from the set phase to another phase, and thus the rotational phase (or position) of the rotor can be adjusted as desired.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A spinning reel comprising:
    a reel body mountable on a fishing rod and supporting a rotor drive mechanism to which a handle is fitted;
    a rotor supported forward on said reel body for rotation via said handle and said rotor drive mechanism and having diametrically opposed first and second rotor arm portions extending axially from a base end thereof;
    a bail arm pivotally supported endwise on said first and second rotor arm portions for pivoting between a line-winding position and line-releasing position; and
    a rotor brake mechanism including
        a substantially annular elastic brake member disposed in a portion of said reel body adjacent said base end of said rotor,
        a first toggle-spring mechanism provided in one of said rotor arm portions and linked with said bail arm for pivoting between first and second positions corresponding respectively to said line-winding and said line-releasing positions, and
        a second toggle-spring mechanism mounted in said base end of said rotor substantially orthogonal to said first toggle-spring mechanism on a shaft substantially parallel to said rotational axis of said rotor, and including a toggle-spring pivoting lever cooperatively linked with said first toggle-spring mechanism for pivoting when said first toggle-spring mechanism is pivoted into the second position, said toggle-spring lever moving in a first direction as said toggle-spring lever comes into contact with said brake member to compress said brake member and brake said rotor, said brake member being compressed in a second direction which is substantially perpendicular to said first direction, said toggle-spring lever moving along said first direction as said toggle-spring lever moves out of contact with said brake member when said first toggle-spring mechanism is pivoted into said first position.

2. The spinning reel as set forth in claim 1, wherein said lever has a tip end portion, said tip end portion has an arcuate shape with respect to a pivot axis of said lever, and said second moving mechanism is positioned such that the tip of the lever contacts said brake member outer circumferentially when moved into elastic deforming contact therewith.

3. The spinning reel as set forth in claim 1, wherein:
    said first toggle spring mechanism includes a first rod having a first end retained in a portion of said bail arm and extending along said rotor arm portion, a first sleeve-like member into which a second end of said first rod is slidably inserted, said first sleeve-like member being midway pivotably mounted in said rotor arm portion, and a first spring inserted into an interior of said first sleeve-like member for biasing said first rod toward said bail arm,
    said lever therein being engageable with a portion of said first sleeve-like member; and
    said second toggle spring mechanism includes a second rod having one end retained in a portion of said lever, a second sleeve-like member receiving said second rod and pivotally mounted on said rotor, and a second spring for biasing said second rod toward said lever.

4. The spinning reel as set forth in claim 1, wherein:
    said first toggle spring mechanism includes a first rod having a first end retained in a portion of said bail arm and extending along said rotor arm portion, a first sleeve-like member into which a second end of said first rod is slidably inserted, said first sleeve-like member being midway pivotably mounted in said rotor arm portion, and a first spring inserted into an interior of said first sleeve-like member for biasing said first rod toward said bail arm,
    said lever therein being engageable with a portion of said first sleeve-like member; and
    said second toggle spring mechanism includes a second rod having one end retained in a portion of said rotor, a second sleeve-like member receiving said second rod and pivotally mounted on a portion of said lever, and a second spring disposed between said second rod and said second sleeve-like member for biasing said second sleeve-like member toward said lever.

5. The rotor brake mechanism for a spinning reel as set forth in claim 1, wherein a protrusion is formed on the reel body for rotational contact with said lever of said second toggle-spring mechanism in said second position to pivot said lever out of contact against said brake member when the rotor is turned while the bail is in the line-releasing position, whereby said first toggle-spring mechanism is pivoted from said second position to said first position to reverse the bail arm from said line-releasing position to said line-winding position.

6. A rotor braking mechanism for use in a spinning reel including a reel body supporting a rotor drive mechanism to which a handle is fitted, a rotor supported on the reel body for rotation via the handle and rotor drive mechanism and having diametrically opposed rotor arm portions extending axially from a base end thereof, and a bail arm pivotally supported endwise on the rotor arm portions for pivoting between a line-winding position and line-releasing position, said rotor braking mechanism comprising:
    a substantially annular elastic brake member disposed in a portion of the reel body adjacent the base end of the rotor;
    a moving mechanism provided in one of the rotor arm portions and linked with the bail arm for moving between first and second positions corresponding respectively to the line-winding and line-releasing positions; and
    a lever disposed on the base of the rotor and cooperatively linked with said moving mechanism, for shifting along a first direction as said lever comes into contact with said brake member to compress said brake member and brake the rotor when said moving mechanism is moved into said second position, said brake member being compressed in a second direction which is substantially perpendicular to said first direction, said lever shifting along said first direction as said lever moves out of contact with said brake member when said moving mechanism is moved into said first position.

7. The rotor brake mechanism for a spinning reel as set forth in claim 6, wherein said lever has a tip end portion, said tip end portion has an arcuate shape with respect to a pivot axis of said lever, and said second moving mechanism is positioned such that the tip of said lever contacts said brake member outer circumferentially when moved into elastically deforming contact therewith.

8. A spinning reel comprising:

a reel body mountable on a fishing rod and supporting a rotor drive mechanism to which a handle is fitted;

a rotor supported forward on said reel body for rotation via said handle and rotor drive mechanism and having diametrically opposed first and second rotor arm portions extending axially from a base end thereof;

a bail arm pivotally supported endwise on said first and second rotor arm portions for pivoting between a line-winding position and line-releasing position;

a rotor brake mechanism including an elastic annular brake member disposed in a portion of said reel body adjacent said base end of said rotor, a first toggle-spring mechanism provided in one of said first and second rotor arm portions and linked with said bail arm for pivoting between first and second positions corresponding respectively to said line-winding and said line-releasing positions, and a second toggle-spring mechanism mounted in said base end of said rotor substantially orthogonal to said first toggle-spring mechanism on a shaft substantially parallel to a rotational axis of said rotor, and including a toggle-spring pivoting lever cooperatively linked with said first toggle-spring mechanism for pivoting when said first toggle-spring mechanism is pivoted into said second position, along a first direction into contact with said brake member to deform said brake member in a direction different from said first direction, whereby said rotor is braked, and for pivoting when said first toggle-spring mechanism is pivoted into said first position, along said first direction out of contact with said brake member; and a protrusion formed on said reel body configured to make rotational contact with said lever of said second toggle-spring mechanism in said second position to pivot said lever out of contact against said brake member when said rotor is turned while said bail arm is in said line-releasing position, whereby said first toggle-spring mechanism is pivoted from said second position to said first position to reverse said bail arm from said line-releasing position to said line-winding position, said brake member being circularly discontinuous near said protrusion, such that said lever is brought out of contact against said brake member just before said protrusion comes into rotational contact with said lever when said rotor is turned while said bail arm is in said line-releasing position.

9. A rotor braking mechanism for use in a spinning reel including a reel body supporting a rotor having diametrically opposed rotor arm portions extending axially from a base end thereof, and a bail arm pivotally supported endwise on the rotor arm portions for pivoting between a line-winding position and a line-releasing position, said a rotor braking mechanism comprising:

a substantially annular elastic brake member disposed in a portion of the reel body adjacent the base end of the rotor; and a shifting member disposed in the rotor and cooperatively linked with the bail arm for shifting when the bail arm is pivoted into the line-releasing position, said shifting member moving along a first direction when said shifting member comes into contact with said brake member to compress said brake member and brake the rotor, said braking member being compressed in a second direction which is substantially perpendicular to said first direction, said shifting member shifting along said first direction as said shifting member moves out of contact with said brake member when the bail arm is pivoted into the line-winding position.

* * * * *